United States Patent [19]

Iwane

[11] 4,062,045

[45] Dec. 6, 1977

[54] THREE-DIMENSIONAL TELEVISION SYSTEM

[75] Inventor: Waro Iwane, Sapporo, Japan

[73] Assignee: The President of Hokkaido University, Hokkaido, Japan

[21] Appl. No.: 660,647

[22] Filed: Feb. 24, 1976

[30] Foreign Application Priority Data

June 2, 1975 Japan .................................. 50-65431

[51] Int. Cl.$^2$ ............................................. H04N 9/54
[52] U.S. Cl. .................................................... 358/88
[58] Field of Search ............... 178/6.5; 358/88, 89–91, 358/2

[56] References Cited

U.S. PATENT DOCUMENTS

| 3,688,045 | 8/1972 | Ohkoshi | .................................. | 178/6.5 |
| 3,811,011 | 5/1974 | Hardy et al. | ...................... | 178/6.5 X |

Primary Examiner—Richard Murray
Assistant Examiner—Mitchell Saffian
Attorney, Agent, or Firm—Flynn & Frishauf

[57] ABSTRACT

A three-dimensional television system wherein a plurality of television cameras are disposed, for example, equidistantly from each other on a horizontal plane including a plurality of foreground subjects; each foreground subject is photographed at a plurality of different planes by using those cameras so as to obtain an image corresponding to each plane; the points of the image thus obtained which correspond to specific points of the foreground subject are mutually connected to form an angular division distribution pattern; this angular division distribution pattern is classified for transmission into brightness signals, depth signals, etc. thereby to restore the image signal of each plane from the brightness signals, depth signals, etc. thus transmitted; and from these restored signals a three-dimensional image is reproduced for display by means of a cathode ray tube (CRT).

16 Claims, 12 Drawing Figures

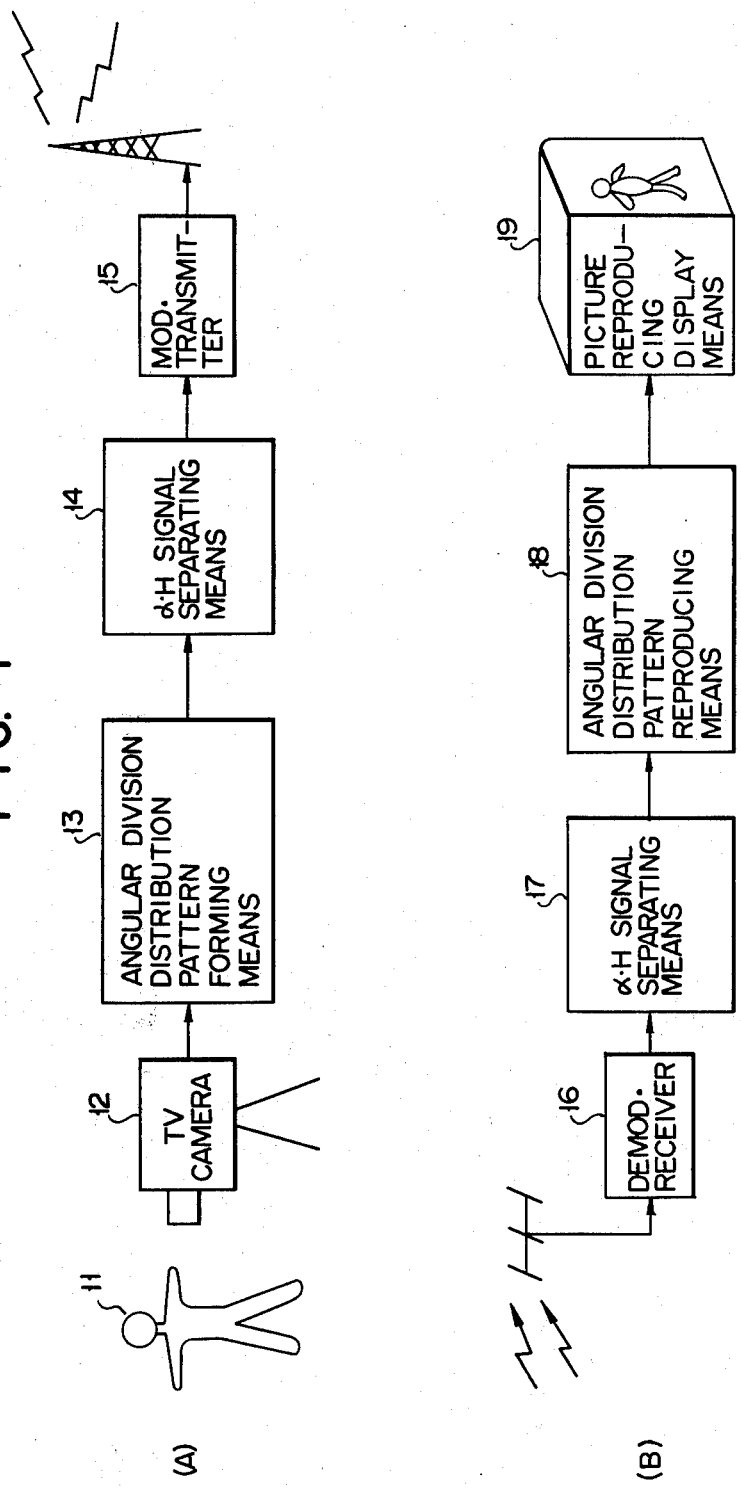

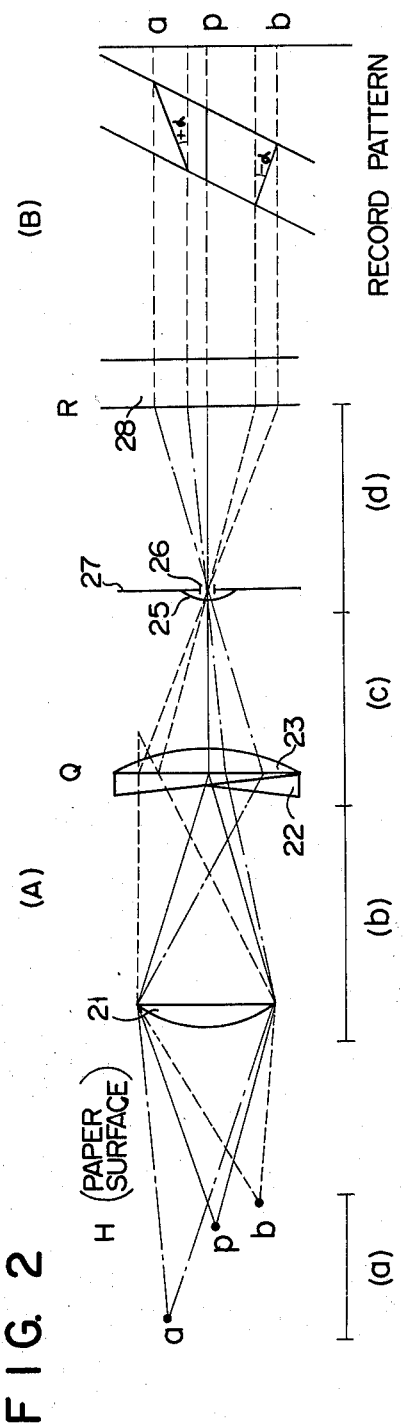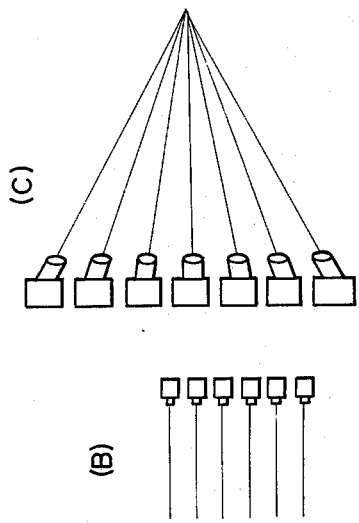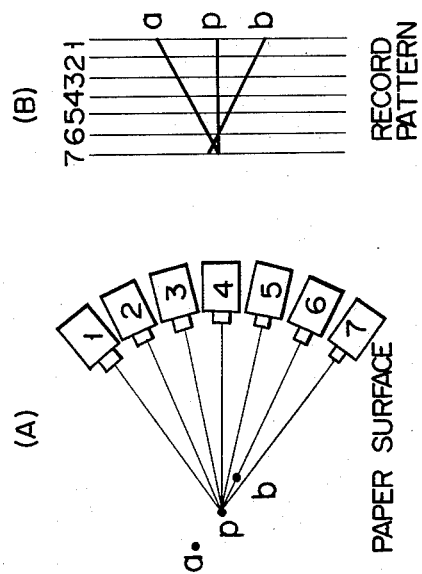

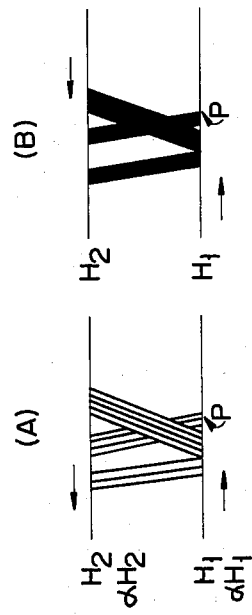
FIG. 10
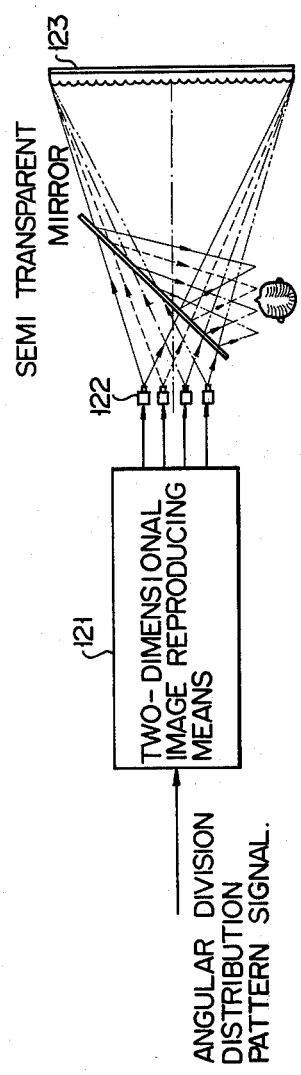
FIG. 12
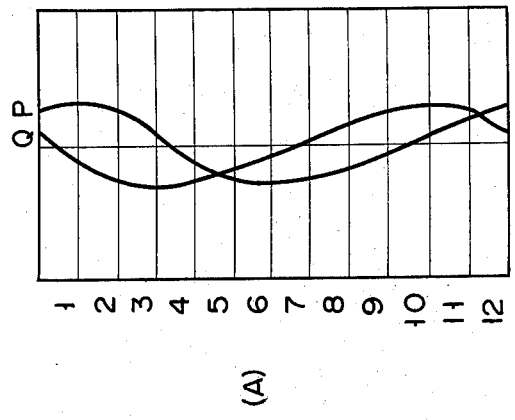
FIG. 11
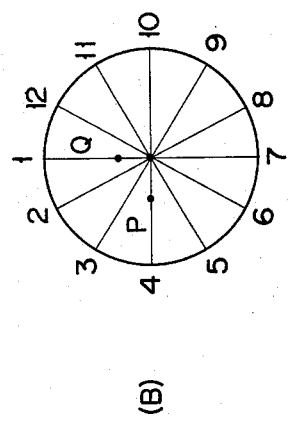

THREE-DIMENSIONAL TELEVISION SYSTEM

This invention relates to a three-dimensional television system wherein a three-dimensional moving object to be photographed is classified into several types of image signals; and the image signals thus classified are transmitted in a form classified for each said type to reproduce a three-dimensional image in accordance with the image signals received on the receiving side.

There have heretofore been reported a variety of proposals or instances concerning a three-dimensional television. Most of them, however, concern a binocular type television (having an amount of message corresponding to that obtained through a binocular vision)— a so-called stereoscopic television. In realizing a true three-dimensional television, i.e., a television for transmitting a true three-dimensional image (wherein, in the case of within a specific visual area, the image on the television can be viewed from a given point of view), many technical problems are encountered. One of the most difficult problems in three-dimensionally displaying not a static image but a moving image not through a binocular vision but through a multi-directional vision is that an amount of message signal to be transmitted is huge. For this reason, the frequency bandwidth required to transmit precise three-dimensional image signals through the resolving lines of the number on the order of the number of those necessary to a usual television broadcasting is increased to as extremely large a value as, for example, scores of GHz or more, thereby rendering it difficult to realize a three-dimensional television.

The object of the invention is to provide a three-dimensional television system which transmits a moving image by largely decreasing the transmitting frequency bandwidth.

SUMMARY OF THE INVENTION

A three-dimensional television system according to the invention comprises means for photographing a foreground subject or an object to be photographed at a plurality of different planes to obtain an image corresponding to each plane, means for forming an angular division distribution pattern by connecting those points of the image obtained by said image-obtaining means which correspond to specific points of the foreground subject, means for classifying for transmission the angular division distribution pattern into brightness signals, depth signals, etc., means for producing an image signal corresponding to said each plane from the brightness signals, depth signals, etc. transmitted by said angular division distribution pattern-transmitting means, and means for reproducing for indication or display a three-dimensional image of the foreground subject from the signals obtained by said image signal-producing means. The above-mentioned signal-classifying and transmitting means classifies the image signal corresponding to each plane to transmit the image signals thus classified. Therefore, it is possible to reduce the amount of image signals corresponding to the three-dimensional image, thereby largely decreasing the transmitting frequency bandwidth. Accordingly, a moving image can be transmitted with a technically possible frequency bandwidth.

Further, according to a preferred embodiment of the invention, means for photographing and means for effecting image reproduction use a conventional camera and a conventional cathode ray tube (CRT), respectively, and in addition the parts of the present three-dimensional television system are interchangeable with those of a conventional television system, thus to facilitate the realization of a three-dimensional television system.

BRIEF DESCRIPTION OF THE DRAWINGS

This invention can be more fully understood from the following detailed description when taken in conjunction with the accompanying drawings, in which:

FIG. 1 is block circuit diagrams on the transmitting and receiving sides of a three-dimensional television system according to the invention;

FIG. 2 is a view for explaining a monocular photographing TV camera used in the three-dimensional television system according to the invention;

FIG. 3 is a view for explaining a multicular photographing TV camera used in the three-dimensional television system;

FIG. 4 is a view showing by way of example the arrangements of multicular TV camera with respect to a foreground subject, made when the multicular photographing is carried out;

FIG. 10 shows examples of an angular division distribution pattern formation made in the case where the brightness signals and depth signals are given;

FIG. 11 shows the relationship between angle and depth (angle of inclination $\alpha$) in the case where the visual field is taken over an angle of 360° under the TV camera arrangement of FIG. 4(A); and FIG. 12 shows an example of a projecting type three-dimensional image display apparatus.

DETAILED DESCRIPTION

Figure 5:
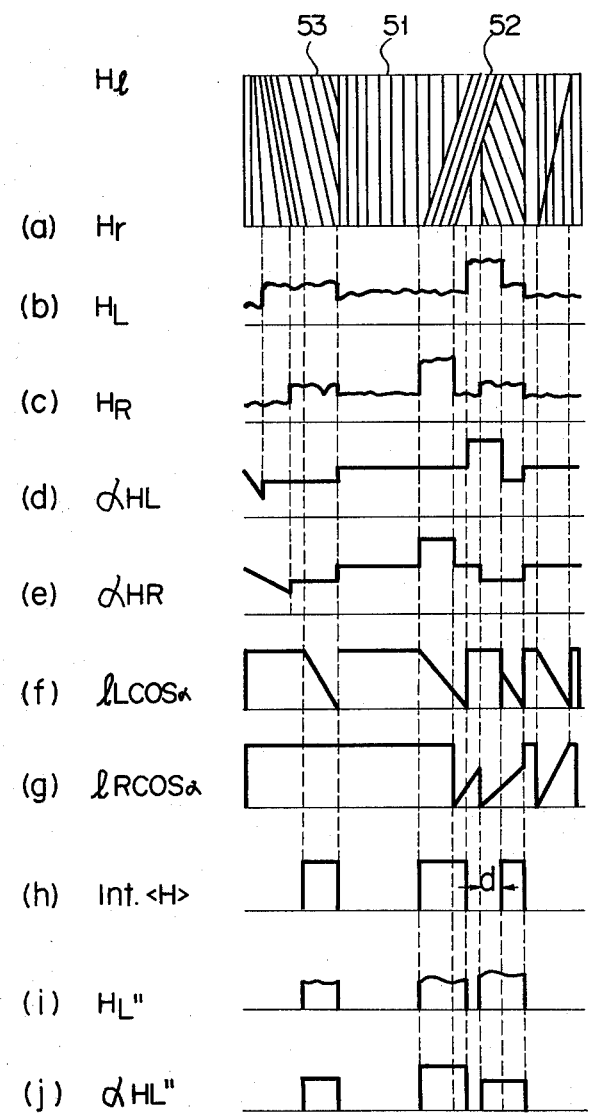
FIG. 5 is the classified state of signals of a three-dimensional image according to the invention.

A three-dimensional television system according to the invention, as shown in FIG. 1, comprises a transmitting side (A) for transmitting a signal obtained by photographing a foreground subject or an object to be photographed, and a receiving side (B) for receiving and demodulating the signal transmitted from the transmitting side (A) to reproduce a three-dimensional image of the foreground subject. The transmitting side (A) comprises a television camera 12 (which is hereinafter referred to as "TV camera" or simply as "camera") for photographing a foreground subject, for example, a human being 11 at a plurality of different planes to obtain an image corresponding to each plane, means 13 for connecting the points of the image thus obtained which correspond to specific points of the foreground subject to form an angular division distribution pattern (which in this specification is defined to mean an "image-recorded pattern obtained by discriminating by proper optical means the image signal (light flux) corresponding to each said plane for each angle of incidence to an optical reference plane"), means 14 for separating and classifying the angular division distribution pattern signals thus obtained into brightness signals, depth signals indicating the depth field of the foreground subject as photographed for each said plane, etc., and a modulating transmitter 15 for modulating and transmitting the brightness signals, depth signals, etc. classified by the separating and classifying means 14, whereby the output signal from the modulating transmitter 15 is transmitted from a transmitting antenna in the form of an electric wave.

The receiving side (B) comprises a demodulating receiver 16 for receiving the signal wave transmitted from the transmitting side (A) through the receiving antenna to demodulate the signal received, means 17 for separating the brightness signals, depth signals, etc. similar to those of said transmitting side from the output signals from the demodulating receiver 16, means 18 for re-forming an angular division distribution pattern from the output signals from the separating means 17, and an image-reproducing and displaying means 19 for reproducing the foreground subject 11 into a three-dimensional image upon receipt of the output signal from the re-forming means 18, whereby a three-dimensional image capable of being seen or viewed from a given point of view falling within a specific area is reproduced by the image-reproducing and displaying means 19.

The above-mentioned three-dimensional television system is hereinafter further explained in turn from the means constituting the transmitting side shown in FIG. 1.

First, it is described what the photographing system of a photographing means composed of the TV camera 12, angular distribution pattern forming means 13 and separating means 14 is. From the description of this photographing system it will be judged in what form of three-dimensional signals the foreground subject should be expressed and what form of three-dimensional signals should be given in order to reproduce the foreground subject as a three-dimensional image in accordance with those three-dimensional signals.

Second, it is described how, with a view to the necessity of largely decreasing a transmitting frequency bandwidth for applying the three-dimensional signals necessary to transmission to a conventional television communication system, those three-dimensional signals should be classified to decrease the bandwidth.

Now, a TV camera for use in the photographing system according to the invention is explained. The photographing system based on the use of this TV camera is explained in a manner divided into two types-monocular and multicular types.

FIG. 2 is a systematic view for explaining a monocular photographing TV camera according to the invention. In FIG. 2, the TV camera has a novel optical system comprising an optical focussing section (b) for focussing an object to be photographed (a), an incident angle discriminating or dividing section (c) for discriminating an incident light flux at a certain focussing plane for each incident direction, a recording and converting section (d) for recording an angular division distribution pattern prepared by discriminating and angularly-dividing the incident light flux for each incident direction, that is to say, for converting an optical signal into an electric signals.

It is now assumed that in said novel optical system an objective lens 21 is used for the focussing section (b); a direction-discrimination or dividing prism 22 and a collective lens 23 are used for the incident angle discriminating or dividing section (c); and a reference plane for an angle of light incidence at the incident angle discriminating or dividing section (c) is Q. It is further assumed that a small lens 25, a medium 27 having a pinhole 26, and a photoelectric conversion recording member 28 are used for the recording and converting section (d); and objects to be photographed (a) are dots a, b and p. The optical system having the above-mentioned construction is hereinafter referred to as "angularly-dividing prism system."

Suppose, in this angularly-dividing prism system, that a horizontal sectional plane including the object (a) and the photographing camera is an H plane (paper surface). Then, the light fluxes transmitted from the objects a, b and p through the objective lens 21 are discriminated for each angle of light incidence with respect to the reference plane (Q plane) in terms of light path. The direction-discriminating or dividing prism 22 is a one wherein a number of prisms sequentially slightly different in refracting direction from each other are superposed one upon another. Accordingly, the light flux transmitted through the objective lens 21 is angularly-divided by means of the prism 22, depending upon the extent to which the refracting direction is changed. This light flux is then converged by means of the collective lens 23, and then passes through the small lens 25 and the pinhole 26, and finally is converted by the photoelectric converting plane (R plane) into electrical signals to be recorded. In this case, the light fluxes incident to the photoelectric conversion plane (R plane) are kept in the same condition as that of those classified for each incident direction at the reference plane (Q plane). Accordingly, at this R plane the electrical signals classified for each incident direction are obtained.

Since, in FIG. 2, the small lens 25 and pinhole 26 are disposed at a focussing position of the collective lens 23, the Q plane is in coincidence with the principal plane of the collective lens 23. However, the Q plane is generally an imaginary plane perpendicular to an optical axis and the position of the Q plane varies with the distance between the collective lens 23 and the small lens 25 and pinhole 26. Since, actually, the prism 22 has some thickness, arrangement should be so made that the light flux has a width taken perpendicularly to the optical axis correspondingly to said some thickness, but through vertically extending the image on the Q plane the problem as to the Q plane arising from the thickness of the prism 12 is solved. On the Q plane only the object having a focussing relation with the Q plane is sharply focussed whereas on the R plane, an angularly-divided image (the images classified for each angle taken with respect to the reference plane) is recorded, that is to say, on the R plane, in principle, images having no "blur" are formed for each direction (for each angle taken with respect to the reference plane). Reversely speaking, when the directionally-divided images recorded on the R plane are overlapped, the resulting image is an image on the Q plane (incident light flux). Further, the small lens 25 is placed at such a position as to permit the real image on the Q plane to be focussed on the R plane, and the effective aperture of the lens 25 is determined by the diameter of the pinhole 26. Accordingly, the diameter d of the pinhole 26 determines the accuracy with which the directionally-divided image (light flux) is obtained, namely, the incident light flux is angularly-divided.

Accordingly, in FIG. 2, the individual objects in the object section (a) are each angularly-divided through the optical system of FIG. 2 and recorded on the photoelectric conversion plane (R plane) as an angularly-divided image. For a better understanding, explanation is made of a record pattern on the R plane on the assumption that the foreground subjects in the object section (a) on the horizontal sectional plane (H plane) including the camera are dots. When it is now assumed that the dot p is placed in a position at which it is exactly focussed on the Q plane by the lens 21; the dot a is placed further than the point p with respect to the optical system; and the dot b is placed nearer to the optical system than the dot p, the dot p is focussed on the Q plane while the dot a is over-focussed and the dot b is under-focussed with respect to the Q plane. Accordingly, the angularly-divided record pattern of the dots a, b and p on the R plane is as shown in FIG. 2(B). That is, the dot p exactly focussed on the Q plane is recorded as a vertical line on the R plane, while the dot a over-focussed on the Q plane and the dot b under-focussed on the Q plane are recorded in a manner inclined toward a (−) side and a (+) side with respect to said vertical line of the dot p (in this case, the clockwise direction with respect to this vertical line is assumed to be (+) and the counterclockwise direction is assumed to be (−)). At this time, as shown in FIG. 2(B), these inclinations $\alpha$ denote the depth fields of the dots a, b and p.

As stated above, the diameter d of the pinhole 26 determines the precision or accuracy angular division (the precision of the depth field). Accordingly, where the diameter d is large, the amount of light incident, to the R plane is increased to permit the recording and converting section (d) to produce an electrical output signal having an increased level, but the precision of angular division is decreased. Conversely, where the diameter d is too small, an image difracted by means of the pinhole 26 is formed on the R plane. Actually, when the diameter d of the pinhole 26 is about 0.02 mm or less, the effect of the diffraction begins to be produced.

The above-mentioned precision of angular division is directly related to the precision of the depth field of a reproduced image and therefore is a matter of great significance, and a decrease in this precision acts very conveniently on a human eye owing to the nature of visual sence. When it is now assumed that the precision of angular division is lowered by degrees, it appears to the human eye that an image of the dot p focussed on the Q plane is not "blurred" and, as a distance from the dot p is varied forwardly or backwardly of the dot p (the dot a or b of FIG. 2), an image of the foreground subject is "blurred." This accords with a visual form of the human eye, and therefore no unnatural feeling is given to the human eye. The problem concerning the precision of angular division is of importance since this precision is similarly related to the image reproduction.

Besides the use of the above-mentioned "angularly-dividing prism system" the use of an "angularly-dividing slit system" is possible. This system is so designed that with no use of the discriminating or dividing prism 22, with the intact use of the collective lens 23, and with the use in place of the pinhole 26, of an angularly-dividing slit (formed obliquely to the optical axis) within the effective apperture of the lens 25, of the optical system shown in FIG. 2, the direction of light incident to the Q plane can be discriminated divided by the extent to which it is displaced from the central position of the slit. The remaining optical sections of the angularly-dividing slit system can be made similar to those of said angularly-dividing prism system. Accordingly, and angular division distribution pattern similar to that shown in FIG. 2(B) can be obtained at the R plane also in the case of using this angularly-dividing slit system.

From the foregoing description the process in which the foreground subject is formed into an angular division distribution pattern by means of the monocular photographing means, i.e., the camera 12 and angular division distribution pattern forming means 13 of FIG. 1 has been clarified.

In the above-mentioned monocular photographing method, reference was made only to the operation at the vertical sectional plane, but where a reproduced image is desired to be finished, the same operation has simply to be repeatedly carried out while being vertically displaced as in the vertical scanning of the conventional television system. Further, where, in the monocular photographing method, the effective aperture of the objective lens 21 is small, the angle of incidence of light incident to the Q plane is limited, which results in the formation of an image having a narrow visual field. Accordingly, where a sufficient area of photographing (the width of visual field) is desired to be obtained, the effective aperture of the objective lens 21 had better be made larger. Further, in the case of a substance or foreground subject concerning which a sufficient visual difference of R plane (the difference between the inclinations $\alpha$ corresponding to the depth fields of this substance) is capable of being obtained, the effective aperture of the objective lens 21 permits said substance to fall within this affective aperture (in the case where this effective aperture is small, the foreground subject wholly falls within the depth, i.e., focussing depth, the visual difference—the difference in the angle of inclination $\alpha$—is not produced). Namely, in the case of performing a near-by photographing, said monocular photographing is appreciably effective. In the case of carrying out a distant photographing, said monocular photographing offers the difficulties in obtaining a sufficient visual difference on the record plane (R plane). Hereinafter, therefore, explanation is made of the multicular (i.e., multiple image) photographing method in which a sufficient visual difference is obtained on the record plane (R plane) even in the case of conducting the distant photographing.

In the multicular (multiple image) three-dimensional television photographing system, a plurality of television cameras (conventional TV cameras are available) are arranged on a horizontal plane including a foreground subject. In this case, the foreground subject is assumed to be photographed in a condition wherein a central point P of the foreground subject is focussed at a center (as on the horizontal plane) of each television camera. That is, as shown in FIG. 3(A), for example, seven TV cameras (1) to (7) are equidistantly arranged on the circumference of a circle whose center is the point P. Since the TV cameras (1) to (7) are arranged to the same horizontal plane, the brightness distribution on a horizontal scanning line of each TV camera corresponds to that of the foreground subject on the corresponding horizontal plane, and each TV camera has this latter brightness distribution recorded therein. Accordingly, when the individual points a, p and b of FIG. 3(A) are assumed to be present on the same horizontal plane, those horizontal brightness signals of the points a, p and b in one horizontal scanning period which are obtained on an H plane (paper surface) by means of each TV camera have such a pattern as shown in FIG. 3(B). Where innumerable TV cameras are arraged in said manner, this pattern accords with said angularly-divided pattern (FIG. 2(B)) on the record plane (R plane) obtained using the monocular photographing method. That is, the angularly-divided pattern of FIG. 2(B) is substantially the same as the record pattern of FIG. 3(B). Accordingly, in both of the monocular and multicular photographing methods, scanning line treatment can be carried out in the same manner.

The multicular (multiple image) photographing method differs from the monocular photographing method in that through increasing the TV cameras in number the visual difference on the record plane (R plane) is increased to enlarge the area of photographing as the foreground subject (the photographing is possible also at an angle of 360°); and if the TV cameras used are incorporated into one unit, the multicular photographing method will be put to more practical use than the monocular photographing method. Further, the multicular photographing method is advantageous also in that through removing the demerits of the monocular photographing method a sufficient visual difference on the R plane is obtained in the distant photographing. When the individual TV cameras are focussed on the point P with the record pattern of FIG. 3(B), there arises a problem that other planes ahead and back of the point $p$, the points $a$ and $b$ in this embodiment, are "blurred" in principle. However, the multicular photographing method has the same effect as that attained in the case where, in the monocular photographing method, the angularly-dividing precision is decreased and at the same time this problem of "blurred" has corresponding relationship with the general property of the visual sense. Therefore, no unnatural feeling is driven to the human eye. If the effective aperture of the objective lens of each TV camera is decreased said "blur" will actually fall within the depth of a field to be photographed (namely, within the focussing depth). As a result, the "blur" problem is solved.

With respect to the multicular photographing method, various relations exist between the foreground subject and the TV camera arrangement, and this TV camera arrangement can be selectively determined in accordance with the applications of TV cameras such as the photographing of a distant view, moving object, or near-by object. That is, the TV cameras can be arranged as shown, for example, in FIGS. 4(A), 4(B), and 4(C). In any case of FIG. 4(A), 4(B) and 4(C) the formation of an angular division distribution pattern can be considered in the same way as described above. In the camera arrangement shown in FIG. 4(A), photographing can be performed at a visual field of 360°. Those lines on an angular division distribution pattern obtained using the camera arrangement of FIG. 4(A) which are obtained by connecting the points corresponding to specific points of the foreground subject each have a curvature. Therefore, an angle of inclination $\alpha$ denoting the depth of the foreground subject is difficult to determine. In the case of FIG. 4(B), the TV cameras are arranged on corresponding parallel straight lines and the respective visual fields of the TV cameras coincide with each other at an infinite constant point. This camera arrangement indeed has the drawback that the visual field is limited as a matter of course, but has the merits that the TV cameras of conventional system can be used as the photographing cameras and that since those lines on an angular division distribution pattern obtained using this camera arrangement which are obtained by connecting the points of the foreground subject corresponding to specific points of the record image are theoretically linear, the determination of said angle of inclination $\alpha$ is facilitated. FIG. 4(C) shows a TV camera arrangement which is intermediate between those shown in FIGS. 4(A) and 4(B). That is, in FIG. 4(C), the TV cameras are equidistantly arranged on corresponding parallel straight lines, and the respective lens face (main face) of the TV cameras are always kept parallel to and equidistantly from a focussing plane, and a given flat plane included within a photographing space is used as said focussing plane common to each TV camera. Accordingly, where this TV camera arrangement is adopted, the conventional TV cameras should indeed be used as the photographing cameras by being more or less altered in respect of the optical system, but said TV camera arrangement has the merits that the photographing object plane can be freely selected and that since those lines on the angular division distribution pattern which are obtained by connecting the points of the foreground subject corresponding to specific points of the recorded image are theoretically linear, the determination of said angle of inclination $\alpha$ is made easy. The photographing method shown in FIG. 4(C) is optically most similar to said monocular photographing method.

From the foregoing description, it has been made clear that the foreground subject can be formed into an angular division distribution pattern by the multicular photographing means of the invention, i.e., the TV camera 12 and angular division distribution pattern forming means 13 shown in FIG. 1. Further, it has been made clear that whether the TV camera 12 of FIG. 1 is a monocular TV camera wherein such a novel optical system as shown in FIG. 2 is applied to a conventional TV camera, or a multicular TV camera wherein a plurality of conventional TV cameras as shown in FIG. 3 are used, the resulting angular division distribution patterns are substantially the same.

Hereinafter, it is explained how the angle of inclination $\alpha$ denoting the depth of a foreground subject and the directionally-divided brightness signal H of the foreground subject are classified and determined by the signal separating means 14 from an angular division distribution pattern obtained by the pattern forming means 13.

For clarification of explanation, let's consider a general angular division distribution pattern represented by the angular division distribution pattern shown in FIGS. 2(B) and 3(B). FIG. 5($a$) shows a considerably generalized angular division distribution pattern. Suppose now that the pattern of FIG. 5($a$) is transmitted by horizontal and vertical scanning without being classified into, for example, directionally divided angles of inclination $\alpha$ and brightness signals, and a considerably large transmitting frequency bandwidth is required. That is, assume now that under the condition of "certain" photographing distance and area the number of directions necessary to reproduce a stereophonic feeling of the foreground subject is N. Then, if it is desired to obtain a resolution equal to that obtainable with a conventional television, a transmitting frequency bandwidth of 4·N MHz is required on the assumption that the transmitting frequency bandwidth is 4 MHz. When photographing is carried out under the condition wherein the photographing distance is set at 4m or less from the screen and the photographing area is in the range of ±50°, a two-dimensional image corresponding to about one hundred directions becomes theoretically necessary. At this time, accordingly, the required transmitting frequency bandwidth is 400 MHz, which value is not practical. For this reason, in realizing a three-dimensional television it is essentially required to classify the pattern signal of FIG. 5(a) and transmit it, thereby to decrease the transmitting frequency bandwidth.

This invention has been achieved in consideration of the above, and explanation is hereinafter made of the division, classification and arrangement of the angular division distribution pattern of FIG. 5(a) on the assumption that this pattern is generally realizable. When it is now assumed that in FIG. 5 a left side section of the pattern taken along one unidirectional horizontal sectional plane and a right side section thereof are represented by H$l$ and H$r$, respectively, the followings will result.

1. The depth of the foreground subject is shown as the inclination $\alpha$ of oblique lines obtained by connecting the points corresponding to specific points of the foreground subject. In the case of the monocular photographing method the point whose image passing through the objective lens 21 is focussed on the reference plane (Q plane), and in the case of the multicular photographing method the point whose plane is equidistant from the lens face and included the point $p$, are each represented in the form of a vertical line as shown by a numeral 51 of FIG. 5. In this case, said inclination $\alpha$ is represented varying with the distance at which the plane including said point is situated. In the case of FIG. 5(a), when the inclination $\alpha$ is positive (said vertical line is inclined forward the right as indicated by a numeral 52 of FIG. 5), the foreground subject is near-by, while when the inclination $\alpha$ is negative as indicated by a numeral 53 of FIG. 5, the foreground subject is distant.

2. Since, as will be understood from the item (1), the individual points on the oblique lines (which though, strictly speaking, these lines have a small curvature, are here dealt with as being substantially linear) represented by the inclination $\alpha$ are the corresponding ones of the foreground subject, the brightness of said individual points can be assumed to be the same in almost all cases. (where these individual points are not equal in brightness, said oblique lines are classified into two types— one presenting a continuous variation of the individual points and the other presenting a partially discontinuous variation of the individual points.)

3. Where the oblique lines are completely drawn from said H$l$ to said H$r$, it means that the point corresponding to each point on the oblique line can be photographed from every angle in the photographing area.

4. Where a pair of foreground subjects are overlapped, a distant one is hidden by a near-by one. In the case of FIG. 5(a), the lines having a smaller inclination $\alpha$ are cut off necessarily by the lines having a larger inclination $\alpha$. This is here referred to as "Law of $\alpha$ priority."

In accordance with the above consideration items (1) to (4), the angular division distribution pattern of FIG. 5(a) is classified as follows.

1. Brightness distribution on H$r$ (c)
2. Brightness distribution on H$l$ (b)
3. Distribution of the inclination $\alpha$ of oblique lines drawn from H$r$ (e)
4. Distribution of the inclination $\alpha$ of oblique lines drawn from H$l$ (d)
5. Distribution of the length of oblique lines drawn from H$r$ (g)
6. Distribution of the length of oblique lines drawn from H$l$ (f)
7. Pattern portion left out of the above signal classification (h)

The brightness distributions on H$r$ and H$l$ in the above items (1) and (2) are for the most part common. Further when, as understood from the consideration item (4), the inclination $\alpha$ of oblique lines in the above items (3) and (4) is determined, the length of oblique lines in the above items (5) and (6) is primarily determined. Therefore, the signals of the items (5) and (6) are prepared from those of the items (3) and (4). Accordingly, when only independent signals are drawn out and classified for transmission, the followings will result.

i. Brightness distribution on H$r$; H$_R$
ii. Brightness distribution of oblique lines drawn from H$l$ and having no corresponding points to H$l$ on H$r$; H$_L'$
iii. Distribution of the inclination $\alpha$ of oblique lines drawn from H$r$
iv. Distribution of the inclination $\alpha$ of oblique lines drawn from H$_L'$
v. Pattern signal portion left out of the above signal classification Upon transmission of the pattern signal portion ($v$), it is possible that the signal ($v$) is dealt with, as a signal H$_L''$, in the form projected on the signal H$_L'$ since H$_L'$ has some interval having no H$_L$ signal (See FIG. 5($i$) and 5($j$)). Even by so doing, the signal of the above ($v$) will not be lost if the "Law of $\alpha$ priority" is applied. Hereinafter, the signal processing process including a further specific case with the signal in the item ($v$) is explained.

Figure 6:
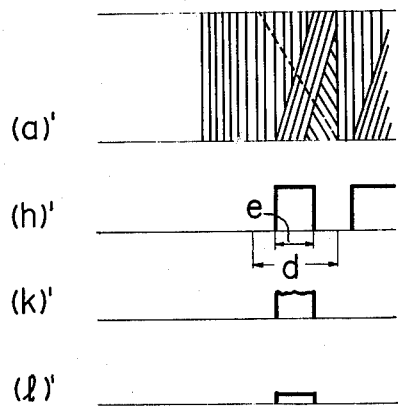
FIG. 6 is a specific example of the classified state of signals of a three-dimensional image similar to the one of FIG. 5.

That is, the angular division distribution pattern of FIG. 5(a) can finally be classified into four types of FIGS. 5(c), 5(e), 5(i) and 5(j). The fact that the angular division distribution pattern (a) is classified into the signals (c), (e), (i) and (j) means that the pattern of (a) can be completely reproduced. This means that an angular division distribution pattern is reproducible from an "angle of inclination" signal denoting the depth of a foreground subject and a brightness signal of the foreground subject. Accordingly, the signals of (c), (e), (i) and (j) have only to be transmitted as a transmission signal. An interval $d$ of the signal (h) is a region successively connected neither to H$r$ nor to H$l$ of the pattern (a), and the signals prepared by overlapping the brightness signal and inclination $\alpha$-signal obtained when said region has been projected on H$l$, upon the signal of H$l$, are shown in FIGS. 5($l$) and 5($j$) in the form of signals H$_L''$ and $\alpha$ H$_L''$. In the case of an angular division distribution pattern shown in FIG. 6(a)', the signal of ($v$) is naturally required to be projected on H$_L'$ by the extent corresponding to a period $d$ but is actually overlapped upon the signal of H$_L'$ only by the extent corresponding to a period $e$. For this reason, the signal of ($v$) is cut or becomes shorter than the signal being fully projected by the extent corresponding to the period $e$, and as a result the pattern of FIG. 6(a)' fails to be completely reproduced. The shortage signal is as shown in FIGS. 6(k)' and 6(l)' and, by transmitting also the signal of (k)' and (l)' together, the pattern of FIG. 6(a)' can be completely reproduced. Whether or not the transmission of the signal of (k)' and (l)' is necessary are conveniently determined by a viewer's subjective evaluation concerning an actual image. However, the probability of occurrence of the intervals $d$ and $e$ is considerably low in terms of time and space, and in addition the signal of (k)' and (l)' becomes necessary only at the time, and portion, when and where the intervals $d$ and $e$ are overlapped upon each other. Accordingly, even if the signal of $(k)'$ and $(l)'$ is transmitted together, the transmitting time and portion for this signal will be limited to an appreciable extent. Therefore, the intervals $d$, $e$ can be processed with little increase in the transmitting frequency bandwidth. When the transmitting system is desired to be simplified, it is possible and best that under a "certain" assumption an anticipative signal is prepared on the receiving side with no transmission of the signal of $(k)'$ and $(l)'$, thereby to process the intervals $d$, $e$. Hereinafter, therefore, explanation is made of the case where the angular division distribution pattern of FIG. 5($a$) can be completely reproduced by the signal of $(c)$, $(e)$, $(i)$ and $(j)$, considering separately the case where an isolated portion where the angular division distribution pattern can not be completely reproduced is produced as in the pattern of FIG. 6($a$)'. When the signal of $(c)$, $(e)$, $(i)$ and $(j)$ is closely investigated, the variation of the angle of inclination $\alpha$ is extremely small as compared with that of the brightness to such an extent that if only the initial value of $\alpha$ at the point of time when this $\alpha$ has been discontinuously varied is transmitted, the variation of $\alpha$ will be sufficiently expressed by making approximately linear the interval between the initial discontinuous point and the next discontinuous point of $\alpha$. Accordingly, the transmitting way of $\alpha$ includes, for example, the followings.

1. $\alpha$ is transmitted as it is. That is, the signal waveform of $(e)$ and $(j)$ is transmitted as it is.

2. When $\alpha$ is discontinuously varied, the initial value of $\alpha$ and $d\alpha/dt$ are transmitted with a signal density permitting the approximation of $\alpha$ to a linear pattern.

3. $\alpha$ is transmitted only when having been varied to a larger extent than $\Delta\alpha$.

If, in the transmission of $\alpha$, as in the above item (1), the signal of $(e)$ and $(j)$ is transmitted as it is, the pattern of ($a$) will be precisely reproduced, on the basis of the signal of $(e)$ and $(j)$, on he receiving side. Even when $\alpha$ transmission is made using the transmission way of the above items (2) and (3) instead of fully transmitting the signal of $(e)$ and $(j)$, it can be sufficiently anticipated by psychological test that not problem will arise from the standpoint of visual sense. If $\alpha$ transmission is possible with the above item (2) or (3), the $\alpha$ signal will be able to be transmitted in a manner that it is overlapped upon the brightness signal. By so doing, the transmitting frequency bandwidth can be decreased further.

In the foregoing description, reference was made to what type of classified signals should be transmitted on the transmitting side and how, in order to reproduce on the receiving side an angular division distribution pattern prepared by the TV camera 12 and pattern forming means 13 of FIG. 1 through classifying and arranging the signals of said angular division distribution pattern.

Hereinafter, explanation is concretely made of the signal separating means 14 of FIG. 1 for actually reading out the brightness signals H and the angle of inclination $\alpha$ from the angular division distribution pattern of FIG. 5($a$). It is easily realizable by the conventional technique to produce the signal of FIGS. 5($c$) and 5($i$) by the signal separating means 14. However, it requires a considerably high level of technique to read out the angle of inclination $\alpha$ from the angular division distribution pattern of FIG. 5($a$). Hereinafter, the process of reading out the angle of inclination $\alpha$ from the pattern of FIG. 5($a$) is explained. Desirably, the detection of the "angle of inclination" signal $\alpha$ is effected at high speed.

But, the input and output operation with respect to the separating means 14 shown in FIG. 1 had better be precisely carried out even if it takes a long time. If, on the transmitting side, the associated apparatus is permitted to become complicated in structure, the separating means 14 may be provided with means for forming a one frame chart of the angle of inclination $\alpha$ (a chart showing the distribution of $\alpha$) corresponding to a one frame brightness distribution of the image, whereby while $\alpha$ is being read out from an $\alpha$ chart signal supplied from said $\alpha$ chart forming means in response to the signal of $(c)$, $(i)$, this $\alpha$ is transmitted in the form of the signal of $(e)$, $(j)$, or alternatively the $\alpha$ chart signal is intact transmitted with a specific frequency. Finally, it is reasonable to determine the value of $\alpha$ taking also the vertical visual difference into consideration. Or, according to the psychological test, it may be sufficient to determine the value of $\alpha$ only from the horizontal visual difference. As the message for determining the value of $\alpha$, the followings are considered:

1. An angular division distribution pattern corresponding to one horizontal sectional plane (FIG. 5($a$))

2. A plurality of vertically adjacent angular division distribution patterns of horizontal scanning.

Figure 7:
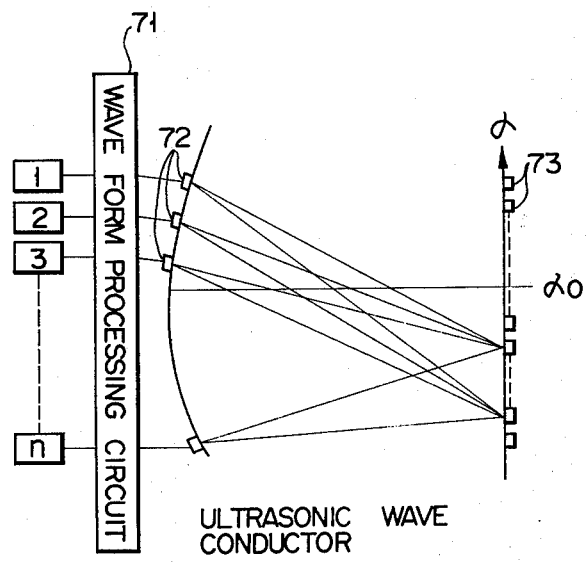
FIG. 7 shows a construction of detecting means for detecting a depth signal (angle of inclination $\alpha$) of the foreground subject from the signals of a corresponding three-dimensional image.

3. In addition to the messages of the above items 1 and 2, a vertical angular division distribution pattern obtained by arranging the TV cameras also in a vertical direction to draw out a vertical visual difference Next, the "angle of inclination" signal $\alpha$-detecting means is explained. Referring to FIG. 7, seven types of brightness signals read out for each direction from the horizontal brightness signal or angular division distribution pattern signal supplied from an $n$ number of TV cameras are allowed to pass through a waveform processor 71 to be applied to corresponding ultrasonic wave vibrators 72 constituting an ultrasonic wave conductor functioning as an ultrasonic wave delay lens. The ultrasonic wave vibrators 72 are vibrated upon receipt of electric signals applied from the external and various vibrators presently put on sale are available. The vibrators 72 are arranged, for example, equidistantly from each other in the form of a circular, or almost circular arc. Where the input signals being supplied to the individual vibrators 72 are simultaneously supplied thereto, the outputs of the individual vibrators 72 are overlapped with some time delay at the center $\alpha_O$ of an $\alpha$ axis (the center of a circle including the circular arc on which the vibrators 72 are arranged). The signals sent out from the TV cameras 1 to $n$ are supplied simultaneously to the vibrators 72, respectively, and the signals passed through the vibrators 72 are each time-delayed or time-advanced in turn in accordance with the angle of inclination $\alpha$ denoting the depth of a foreground subject. Therefore, the positions on the $\alpha$ axis at which said signals passed through the vibrators 72 are overlapped are moved on the $\alpha$ axis in accordance with the time delay or advance of said signals. Accordingly, if a number of ultrasonic wave detectors 73 are provided on the $\alpha$ axis, the detector 73 at the position in which said signals are overlapped will be able to detect the angle of inclination $\alpha$ on the angular division distribution pattern. In FIG. 7, the uppermost position of the $\alpha$ axis (the position of the maximum output of the vibrator 72 at detector 73) indicates the depth of transmission image of the foreground subject. Accordingly, by the $\alpha$ detecting or determining means shown in FIG. 7 the angle of inclination $\alpha$ denoting the depth of the transmission picture image is determined from the angular division distribution pattern transmitted from the TV camera.

Figure 8:
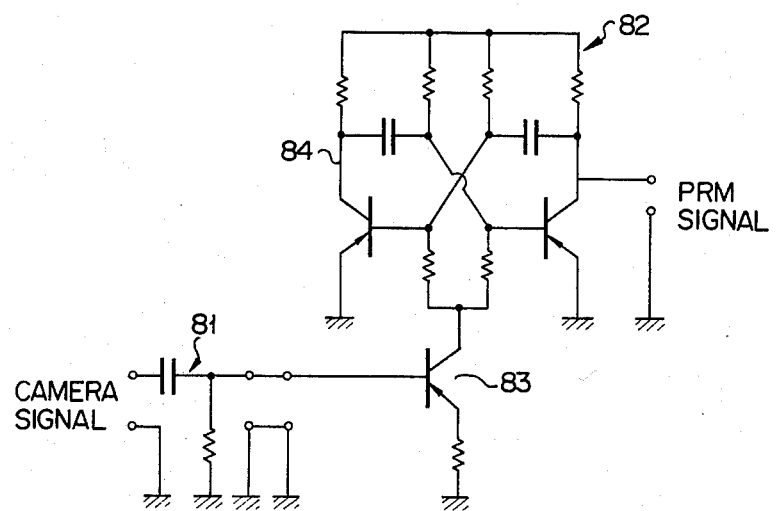
FIG. 8 shows in detail the wafeform processor of FIG. 7.

FIG. 8 shows in detail the waveform processor shown in FIG. 7. This waveform processor is so designed as to convert the signal from each TV camera for purpose of making close the correspondence between the signals applied to an ultrasonic wave vibrator 72, and performs, for example, the edge clarification, differentiation, conversion of said signal from each TV camera to 0 - 1 pattern (zero-one pattern), or conversion from density-chromatically signal to ultrasonic wave frequency.

Further, the waveform processor 71 is used only for purpose of determining the angle of inclination $\alpha$, having nothing to do with the brightness signal being transmitted.

Referring to FIG. 8, a reference numeral 81 designates a high pass filter 81, which is composed of a capacitor and a resistor. The output signal from the filter 81 is an analog signal. An output terminal of the filter 81 is connected to the next stage pulse repetition rate modulation (PRM) circuit 82, which comprises an astable multivibrator 83 and an emitter-grounded transistor stage 84 for varying the cyclical period of repetitive frequency of the astable multivibrator 83 upon receipt of the analog output signal from the filter 81. Note that each of the filter 81 and PRM circuit 82 is provided in the number corresponding to the number of cameras. Accordingly, an image signal sent from each camera has its low frequency wave component cut by each corresponding fileter 81. The analog signal thus cut is applied to a base of the transistor stage 84 to control the current flowing thereinto. Accordingly, the oscillating cyclical period of the astable multivibrator 83 is varied in response to the current variation of the transistor stage 84. That is to say, from the astable multivibrator 83 is produced a pulse signal whose level is proportionate to the level of an image signal sent from each said camera. If the foregoing operation is carried out for each signal sent from each the camera, the correspondence between the signals from the cameras can be reliably achieved in accordance with the variation in brightness of each signal.

In the foregoing description, explanation was made of the process covering from the photographing step in which a foreground subject is photographed for each plane by the TV cameras to form an angular division distribution pattern to the separating step in which the brightness and depth signals are separated from said angular division distribution pattern. These brightness signals and depth signals are applied to the modulation transmitter 15 of FIG. 1 and are there subjected to specific modulation by the carrier wave frequency signal and are then transmitted to the receiving side as three-dimensional picture image signals through the transmitting antenna. Note that the modulation transmitter 15 is easily realizable by the conventional technique, that is, easily made by those in the art with the use of the technique applied to a modulator, a transmitter, etc. for use in the conventional television system.

The foregoing description made clear the construction and function of the individual devices on the transmitting side used in the three-dimensional television system according to the invention. Next, explanation is made of the devices constituting the receiving side, while reference is being made to how the picture image of a foreground subject is reproduced into a three-dimensional picture image in accordance with the three-dimensional picture image signals from the transmitting side.

The electric wave transmitted to the receiving side from the transmitting antenna of FIG. 1 is applied to the demodulation receiver 16 through the receiving antenna. This demodulation receiver 16 is so designed as to demodulate the signal modulated on the transmitting side into the original signal, and is easily realizable by the conventional television technique. The demodulated signal from the demodulation receiver 16 is the brightness and depth signals which are separated and transmitted. The separating means 17 is only for purpose of effecting the signal separation, for example, performs the demodulation of subcarrier signal, or the signal separation by a band pass filter, and can be readily constructed with the use of conventional technique. Namely this means 17 functions to separate from the output signals of the demodulation receiver 16 the angle of inclination signal $\alpha$ denoting the directionally-divided the depth of the foreground subject and the brightness signal H. The separated depth and brightness signals are applied to the angular division distribution pattern forming means 18 to reproduce therein the angular division distribution pattern. The pattern forming means 18 on the receiving side are operated reversely to the means 14 on the transmitting side.

Figure 9:
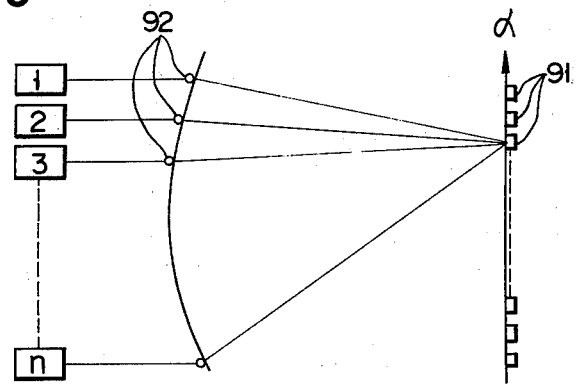
FIG. 9 shows a construction of means for preparing directional brightness signals from the incoming depth signals by performing the opposite operation to that in the case of said detecting means shown in FIG. 7.

For example, in the above-mentioned $\alpha$ determining means on the transmitting side, the $\alpha$ signal transmitted from the transmitting side can be reversely converted into a directionally-divided (for each H-divided) scanning brightness signal of the foreground subject. That is, where it is desired to convert the $\alpha$ signal and H signal into a directionally -divided horizontal brightness signal, the ultrasonic wave vibrator constituting the ultrasonic wave conductor has only to be used as shown in FIG. 9 reversely to the case of FIG. 7. Namely, a number of ultrasonic wave vibrators 91 are provided on the $\alpha$ axis, and a corresponding number of ultrasonic wave detectors 92 are arranged in the form of a circular arc, as shown in FIG. 9. If, under this arrangement, the H signal corresponding to the $\alpha$ signal directionally-divided brightness signal) is applied to the ultrasonic wave vibrator 91 on the $\alpha$ axis corresponding to the position of the transmitted $\alpha$ signal, the horizontal brightness signal time-delayed or time-advanced for each direction in corresponding relation to the angle of inclination signal $\alpha$ is produced from each ultrasonic wave detector 92. In this case, waveform processing is not required, unlike the case with the above-mentioned $\alpha$ determining means on the transmitting side.

As will be understood from the above description, the individual devices or means on the receiving side are obtained by the reverse use of the individual devices or means on the transmitting side. Thus, the reproduction of a three-dimensional picture image is effected by applying the signal from the angular division distribution pattern forming means 18 to the picture image reproducing means 19.

By the way, one of the greatest problem encountered in realizing the three-dimensional picture image television system is up to what extent the transmitting frequency bandwidth can be decreased. Suppose now that in the case of using the item (1) way of the above-mentioned $\alpha$ transmission ways the signal of FIGS. 5(e) and 5(f) is transmitted completely. Then, the transmitting frequency bandwidth is determined depending upon with what resolution and with what frequency the signal of FIGS. 5(c), 5(e), 5(i) and 5(j) is transmitted. The next problem concerns the simplification of the system on the receiving side. The simplification of the system solves at one time both problems of cost and maintenance, thereby increasing the possibility of realizing the three-dimensional television system.

In this case, when it is assumed that the image reproducing means 19 is composed of a plurality of CRT's, the receiving side (B) of FIG. 1 further comprises a signal selecting means for sorting the directionally-divided brightness signal sent from the pattern forming means 18 to allot or distribute it to each CRT corresponding to the divided direction. Accordingly, the plane unit-signal sent from the pattern forming means 18 is applied to each corresponding CRT through said signal selecting means.

Hereinafter, with the above taken into account, explanation is made of the transmitting frequency bandwidth and the picture image reproducing means on the receiving side such as, especially, CRT, memory, etc.

For clarification of explanation, there are shown in Table 1 the type and transmission way of a signal to be transmitted from the transmitting side, the transmission frequency and the transmitting frequency bandwidth required with this frequency of transmission, the necessity of providing a memory on the receiving side and the capacity of the memory, or the matter of the necessity of exploiting or improving CRT. Hereinafter, in accordance with the Table 1 explanation is sequentially made of the transmission signal, that is to say, the transmission way thereof and the picture image reproducing means on the receiving side.

which case, however, no memory is characteristically required. Since, as above described, the $\alpha$ distribution pattern and the oblique line length are prolix or lengthy signals, the transmitting frequency bandwidth is increased. Where it is desired to directly write the pattern of FIG. 5(a) from said signals into CRT or the receiving side, a television CRT of conventional system fails to well serve the purpose, but a CRT for use in an oscilloscope can be conveniently modified for use with the present television system. Technically, in this case, no problem arises, and a precision necessary cn the conventional oscilloscope or less is only required.

In the case of the transmission way (2), a memory having a considerably small capacity is provided on the receiving side, and the signals on the transmitting side are decreased in type so that a transmitting frequency bandwidth of 16 MHz may be sufficient to obtain a resolution on the order of that attainable with the conventional television. In this transmission way, in order to make the above-mentioned "Law of $\alpha$ priority" effective on the receiving side, the brightness signal and $\alpha$ signal are classified for time-divisional transmission into two types—one being scanned from the left to the right, $\vec{H}_1$ and $\alpha_{\vec{H}1}$, respectively and the other being scanned from the right to the left, $\vec{H}_2$ and $\alpha_{\vec{H}2}$, respectively. To explain this with reference to FIGS. 10(A) and 10(B), (A) while the brightness signal $H_1$ is being written, using the signals $\vec{H}_1$ and $\alpha_{\vec{H}1}$, into CRT in the form of the inclination of $\alpha$, (B) the area already written into the CRT is sequentially written into the memory. When it is now assumed that at a point P on the signal $H_1$ this $H_1$ Table 1

| Transmission way | Type of transmission signal | Bandwidth (conventional TV standard) | Memory (N=10) | Remark |
|---|---|---|---|---|
| (1) | $H_1, H_2, \alpha_{H1}, \alpha_{H2}$ $l \cdot \cos\alpha_{H1}$, $l \cdot \cos\alpha_{H2}$ $\overrightarrow{\phantom{x}} \overleftarrow{\phantom{x}} \overrightarrow{\phantom{x}} \overleftarrow{\phantom{x}}$ | 24 MHz or less 30 frame/sec. | No memory | CRT for use in the Transmission way (1) |
| (2) | $\vec{H}_1, \vec{H}_2, \alpha_{\vec{H}1}, \overleftarrow{\alpha}_{\vec{H}2}$ | 16 MHz or less 30 frame/sec. | (a) Memory for angular division distribution patternway (1bit/dot) (b) Memory for Conventional angular division distribution pattern | CRT for use in the Transmission (2)  CRT |
| (3) | $H_1, H_2 ... H_{(M+1)}$ $\alpha_1, \alpha_2 ... \alpha_{(M+1)}$ | 8(M+1) NHz or less M=2 23 MHz or less 30 frame/sec. | Memory for angular division distribution pattern (ultrasonic wave delay lens as described in this specification | Wide-angle CRT having a visual field number of M, Conventional CRT is available |
| (4) | $\Delta H_1, \Delta H_2, \Delta\alpha H_1,$ $\Delta\alpha_{H2}$ | About 1.6 MHz $\Delta \approx 0.1$, 30 frame/sec. | Memory for H and $\alpha$ of one frame and for angular division distribution pattern | Conventional CRT |
| (5) | $\Delta H_1, \Delta H_{T1}, \Delta H_2,$ $\Delta H_{T1}, V_H, V_V, V_D,$ $\Delta\alpha H_1, \Delta\alpha H_2$ | About 500 to 100 kHz 5 frame/sec. | Memory for H and $\alpha$ of six frames and for $H, V_H, V_V$ and $V_D$ of one scanning scanning | Time axis band decreasing type CRT Conventional CRT is available |

In the case of the transmission way (1), upon transmission of the angular division distribution pattern, the length of oblique lines are transmitted in addition to the brightness distribution pattern and $\alpha$ distribution pattern. On the receiving side, the angular division distribution pattern is reproduced from these signals, in intersects the area (the blackened area) already written into the memory coresponding to the CRT, the signal $H_1$ is written into the CRT skipping the already written area since this area necessarily has priority to the signal $H_1$ in accordance with the above-mentioned "Law of $\alpha$ priority." This area is of course written also into the memory as in the above-mentioned operation. On the signal $H_2$, the area portion failing to be written using the signals $\vec{H}_1$ and $\alpha_{\vec{H}1}$ is written into the memory in the same manner as mentioned above as on the signal $H_1$. Since, in order to perform the same operation as on the signal $H_1$, the signal $H_2$ is required to advance in the direction ←, the transmission signal has two opposite directions—$\vec{H}_1, \alpha_{\vec{H}1}$ and $\vec{H}_2, \alpha_{\vec{H}2}$. Since it has simply to be judged whether or not the transmission signal has been written into the CRT, the memory is only required to have one bit capacity per dot. Further, it is also possible to have the CRT partially function as the memory. If the CRT is allowed to have an dead time in which it is nonreactive for a while (one scanning period) after it once has electron beams passed therethrough, the angular division distribution pattern can be reproduced simply by writing the signals $\vec{H}_1$, $\alpha_{\vec{H}1}$, $\vec{H}_2$ and $\alpha_{\vec{H}2}$ into the CRT to eliminate the necessity of providing the memory separately. With respect to the CRT, a CRT for use in the transmission way (2) similar to the above CRT for use in the transmission way (1) is required to be exploited. Further, if the memory is allowed to have a capacity large enough to store only the angular division distribution pattern, a modified one of the CRT for use in the conventional television system will be sufficient to serve the purpose.

3. In the case of such a wide-angle three-dimensional television system as to have a photographing visual angle of 90° or more, of the present three-dimensional television system, the transmission of the signals left out of the classification into the signals $H_1$ and $\alpha_{H1}$ merely overlapped form upon the signals $H_2$ and $\alpha_{H2}$ is anticipated to increase the probability that a "mis-reproduction" occurs. In the case of the wide-angle three-dimensional television, accordingly, the photographing visual field is required to be transmitted in a manner divided into several regions. Referring to FIG. 11, the signal for forming a visual field 1 is $H_1$, $H_2$ and $\alpha_{H1}$, $\alpha_{H2}$, namely, much the same as in the case of the transmission way (2), whereas the signal for forming a visual field 2 is $H_2$, $H_3$, $\alpha_{H2}$ and $\alpha_{H3}$ and this $H_2$ is a signal common to the visual fields 1 and 2 while the signal $\alpha_{H2}$ is also convertible from the visual field 2 to the visual field 1 as later described and these $\alpha_{H2}$ can be equal to each other in terms of approximation. Accordingly, when the number of visual fields is assumed to be M times as large as that in the case of the transmission way (2), there is only required a transmitting frequency bandwidth which is ½(M + 1) times as large as that in the case of the transmission way (2). Assume that in the case of the visual field being 360°, this field is divided into M parts. Then, $H_1$ and $\alpha_{H1}$ are common to $H_M$ and $\alpha H_M$, respectively. At this time, therefore, a transmitting frequency bandwidth M/2 times as large as that in the case of the transmission way (2) is only required. With respect to the memory, two ways are considered. That is, assume that the memory is allowed to have a capacity large enough to store only the angular division distribution pattern. Then, by reading out the brightness signal H and the angle of inclination signal $\alpha$ through horizontal scanning after these are written into the memory, the directionally-divided signal can be reproduced. In contrast, if, with no use of a particular memory on the receiving side, the ultrasonic wave delay circuit network of FIG. 8 described in connection with the signal processing operation on the receiving side is used in the opposite direction to that taken when $\alpha$ is determined, the directionally-divided signal can be directly obtained. What is important to the transmission way (3) is that where the visual field is divided into n equal parts, the brightness of a given point on the nth H signal Hn is generally common to other visual fields, and that the $\alpha$ of all other visual fields which corresponds to said given point is primarily determined by the position of this point on the signal Hn and the value of $\alpha$ corresponding to this position. Accordingly, in order to display a point P of FIG. 11, the brightness and the angle of inclination $\alpha$ of the point P have only to be once transmitted throughout the whole visual field. As a result, the transmitting frequency bandwidth can be largely decreased further.

With respect to CRT, a CRT prepared by somewhat improving a conventional CRT (that is, raising the horizontal deflection frequency) sufficiently serves the purpose.

The transmission ways (4) and (5) are based on the development of the way (3) and are not fully different from the way (3). In the case of the transmission way (4), when it is now assumed that a memory capable of storing therein H and $\alpha$ corresponding to one frame is provided on the receiving side, only the H and $\alpha$ differing from those corresponding to the immediately preceding frame have simply to be transmitted.

Generally, the degree to which the transmitting frequency bandwidth corresponding to one frame is decreased is higher in the three-dimensional television system than in the two-dimensional television system. The reason is that since the above-mentioned "Law of $\alpha$ priority" holds true also in the time-axial direction, those portions of a foreground subject which appear or disappear owing to the motion of the foreground subject can be for the most part prepared from the signals used for the immediately preceding frame, so that in most cases the $\alpha$ signal of the moving object corresponding to the moved portions thereof and a small number of H signals are only required as new transmission signal. The transmitting frequency bandwidth necessary to this transmission way is determined depending upon the percentage of time-variation part to the whole of a picture screen. When rough calculation is made of the transmitting frequency bandwidth with said percentage set at about 10%, this bandwidth is on the order of about 1.6 MHz, which is sufficient to obtain a resolution necessary to the conventional television system.

In the case of the above transmission ways (4) and (5), the H and $\alpha$ signals corresponding to the moved part of the object are transmitted for each frame, and in order to rewrite the immediately preceding H and $\alpha$ by the extent corresponding to said H and $\alpha$ signals, a memory having a capacity corresponding to one frame is required.

The transmission way (5) is directed to largely reduce, on the basis of the way (4), the number of transmission frames by creating the signals $V_H$, $V_V$ and $V_D$ denoting the moving speed of a photographing object and adding these to the transmission signal, aiming at the fact that the image variation with time can be made approximately linear in a specified direction and at a specified speed in the case of within a short period of time (about 60 msec) and that the image variation occurs for each signal group prepared by dividing the transmission signal by the angle of inclination $\alpha$. That is to say, the movement of the photographing object between frames takes the form approximately corresponding to each of the horizontal speed $V_H$, vertical speed $V_V$ and depth-directional speed $V_D$. At this time, a memory is required which has a capacity corresponding to an omitted frame plus a frame corresponding to the resolving threshold value of 15 frames/sec for resolving the image movement determined from the property of visual sense. For example, if, in case image display is made on the visual sense with 30 frames/sec, the transmission signal is transmitted at a speed of 5 frames/sec, the image display is made with the new signals $V_H$, $V_V$ and $V_D$ added to the transmission signal for each 6 frames/sec. At this time, the memory is required to have a storage capacity equal to that for the H and $\alpha$ corresponding to 6 frames plus that corresponding to one scanning of H and V patterns. At that time, the necessary transmitting frequency bandwidth is 1/6 or less of that required for the transmission way (4) and a transmitting frequency bandwidth of 100 kHz will be sufficient. In the case of the transmission ways (4) and (5), the transmitting frequency bandwidth can be decreased more largely than in the case of the two-dimensional television system. The reason is that the above-mentioned "Law of $\alpha$ priority" of a signal of smaller $\alpha$ being hidden by a signal of larger $\alpha$ holds true not only in terms of space zone but also in terms of time zone. This is possible only with the three-dimensional television system. In the case of both the transmission ways (4) and (5), a somewhat modified one of a display CRT for use in the conventional television system will be sufficient to serve the purpose. The above-mentioned memory may be of any type having a storage capacity of about $10^4$ bits such as a storage tube, IC memory for use in computer, etc. Further, in any one of the above-mentioned transmission ways (1) to (5), the number N of directional necessary to reproduce a stereophonic feeling has no direct relevance to the transmitting frequency bandwidth. Generally said N should be determined depending upon the photographing distance and area. However, said N is indirectly related to the precision of $\alpha$ and at the same time is freely determined as required depending upon the way of reading out the signal from the memory on the receiving side.

As above described, it is possible to transmit using any one of the ways shown in Table 1 the angular division distribution pattern obtained on the photographing side, or transmitting side and reproduce the same into the original angular division distribution pattern on the receiving side. On the receiving side, if the angular division distribution pattern is reproduced, the two-dimensional images corresponding to the number of directions required can be obtained, and therefore with the almost intact use of a conventional technique of projecting type three-dimensional image reproduction the three-dimensional image display is possible.

For example, such a projecting type three-dimensional image reproducing system as shown in FIG. 12 may be used. The output from the angular division distribution pattern reproducing means 18 of FIG. 1 is applied to a two-dimensional image reproducing means 121 to reproduce a two-dimensional image corresponding in number to the required direction, and the two-dimensional image thus reproduced is projected for each direction to a directive screen 123 by using a number of projectors 122, whereby to permit a viewer to recognize a three-dimensional image.

In the foregoing description, explanation is made of whether or not a conventional CRT should be modified with respect to the transmission signal, or whether or not a memory should be provided with respect to the transmission signal. Now, it is explained what said novel image display means 19 of FIG. 1 according to the invention is. The display means to be explained hereinafter are all characterized by optically reproducing an angular division distribution pattern in a space or on an image screen. First, explanation is made of the case where the image display means 19 is of the angularly-dividing prism system for use in one CRT. This system will be generally easily understood if consideration is given by reversely tracing the light path in said monocular photographing method on the transmitting side. That is, the photographing means for use in the angularly-dividing prism system is as shown in FIG. 2. Accordingly, an image pickup tube is assumed to be used in place of the photographing tube of FIG. 2. Assume now that an angular division distribution pattern is displayed on the R plane. Then, an optical image of the angular division distribution pattern of a light flux incident to the Q plane vertically thereto is reproduced on the Q plane through the image pickup tube comprised of the pinhole 26, small lens 25 and collective lens 23, and is focussed on the original foreground subject through the angularly-dividing prism 22 and lens 21. Next, if the same angularly-dividing prism 22 and lens 21 as those used when the photographing is performed are used, an image seen through the lens 21 will become a real image whose concave and convex portions correspond to the convex and concave portions of said optical image, respectively. In order to permit said concave and convex portions to be normally seen, several countermeasures are contemplated. One of these countermeasures is for example, to make electronically opposite as a previous processing operation the positive or negative of the inclination $\alpha$ of the angular division distribution pattern with respect to the vertical line on the transmitting side. When conversion from the concave portion to the convex portion is desired to be effected on the receiving side or vise versa, the angular division direction of the angularly-dividing prism has only to be made opposite to that taken when the photographing is performed. Said conversion may of course be made by rendering the positive or negative of $\alpha$ electronically opposite. In any case, said conversion can be made easily.

Next, let's consider the application of an angularly-dividing slit system using one CRT to the monocular photographing method. As above explained in connection with the monocular photographing, this system is so designed as to permit the selection of a light outgoing direction by disposing a slit obliquely within the effective aperture of the small lens 25 with no use of the angularly-dividing prism 22 and pinhole 26. Other means except for the above described can be dealt with similarly to those of the above-mentioned angularly-dividing prism system.

Next, a multiple CRT system using a plurality of CRT's is explained. This multiple CRT system includes a directionally-dividing CRT system. In this system, the directionally-divided signals laterally read out from the angular division distribution pattern reproduced by the angular distribution pattern reproducing means 18 are allotted to the CRT's each provided for each direction, respectively, and are each composed within a space by each CRT into an image (an optical image of the angular division distribution pattern) with the use of an optical system, or projected onto a one-directional screen (which laterally has autocollimation but vertically has diffusibility within a specific limit.). This system is possible if the number N of directions is on the order of about 10 or less, but ceases to be suitable to practical use if the number of directions is increased. Assume, for example, that the number of directions is 100, and 100 CRT's should be arranged. This is not possible from the practical point of view.

Next, a composite multiple CRT system is considered. This system is so designed that the number of directions allotted to each CRT is set to about 10 at largest through time division or position division, whereby a three-dimensional image display whose number of directional divisions is on the order of 100 is possible with a plurality of CRT's.

If, with no use of CRT, improvement is so made as to permit a parallel light flux to be controlled as it stands by using a light valve, the degree of light utilization is more increased than in the case of CRT. Further, a system based on the use of a photochromism, cathode chromism is also considered.

In principle, no screen is required for the present three-dimensional television system. That is, a real image or vitual image is directly viewed or seen at a space. However, where the viewing area is required to be vertically enlarged, such a screen as to horizontally form a plane of complete reflection and horizontally form a plane of diffusion can be utilized.

Further, where image display is desired to be made on a large screen, an image enlarged through a convex lens is preferably focussed, with the use of a projecting system, on the plane of a concave mirror constituting a screen, or on a one-directional screen.

In the above-mentioned display, complete mechanical adjustment, and visual width and visual difference are given with respect to the horizontal direction but not given with respect to the vertical direction. The fact that the visual width and visual difference are not vertically given raises no problem, but the fact that complete mechanical adjustment is not vertically given or made poses a problem only in the case of near-by view (within the range of 2$m$ or less).

According to the invention, since the $\alpha$ signal represents a depth signal denoting the depth field of a foreground subject, a three-dimensional image reproduction is possible in principle not only with the image reproducing means on the receiving side but also with the harmonious horizontal and vertical mechanical adjustments resulting from the improvement on the receiving side.

Further, according to the invention, the depth $\alpha$ as viewed from the TV camera side has a value fixed commonly in both horizontal and vertical directions. Accordingly, there can be obtained a natural three-dimensional picture image in which mechanical adjustment, visual width and visual difference are given not only horizontally but also vertically.

What is claimed is:

1. A three-dimensional television system comprising:
   photographing means for photographing an object to be photographed at a plurality of different planes to obtain a picture image for each said different plane;
   angular division distribution pattern forming means for forming an angular division distribution pattern by connecting respective points of each said image obtained by said photographing means which correspond to the same specific points of said object for each different plane;
   transmitting means for classifying for transmission said angular division distribution pattern into at least brightness signals and depth signals;
   signal preparing means for preparing a signal of each said different plane from at least said brightness signals and depth signals of said signals transmitted by said transmitting means; and
   image reproducing and displaying means for reproducing a three-dimensional picture image of said object from said signal prepared by said signal preparing means.

2. A three-dimensional television system of claim 1, wherein said image reproducing and displaying means comprises converting means for converting said angular division distribution pattern signal into an optical signal, sorting means for sorting said optical signal into an angularly-divided light flux, and focussing means for focussing said angularly-divided light flux passed through said sorting means.

3. A three-dimensional television system of claim 1, wherein said image reproducing and displaying means comprises a plurality of CRT means for receiving a directionally-divided signal laterally read out from said angular division distribution pattern signal, image composing means for composing the output images from said plurality of CRT means, and projecting means for projecting an image obtained by said image composing means.

4. A three-dimensional television system of claim 1, wherein said image reproducing and displaying means comprises a plurality of CRT means, and allotting means for allotting a directionally-divided image signal obtained from said angular division distribution pattern signal to each CRT through time division and position division of said directionally-divided image signal.

5. A three-dimensional television system of claim 1, wherein said transmitting means comprises detection means for detecting an angle of inclination $\alpha$ signal denoting the depth of said object from said angular division distribution pattern.

6. A three-dimensional television system of claim 5, wherein said detection means comprises ultrasonic vibrators disposed in the form of a circular arc and ultrasonic wave detectors for detecting the outputs from said vibrators, respectively, said vibrators and detectors constituting an ultrasonic wave conductor.

7. A three-dimensional television system comprising a multiple image photographing and transmitting apparatus including:
   a multiple image camera means for photographing an object to be photographed at a plurality of different planes to obtain a multiple picture image for each different plane;
   angular division distribution pattern forming means for forming an angular division distribution pattern by connecting respective points of each said image obtained by said multiple image camera means which correspond to the same specific points of said object for each different plane; and
   transmitting means for classifying for transmission said angular division distribution pattern into at least brightness signals and depth signals.

8. A three-dimensional television system of claim 7, wherein said multiple image camera means includes a plurality of cameras disposed on the circumference of a circle whose center is said object.

9. A three-dimensional television system of claim 7, wherein said multiple image camera means includes a plurality of cameras disposed on a corresponding plurality of parallel straight lines.

10. A three-dimensional television system of claim 7, wherein said multiple image camera means includes a plurality of cameras disposed on a corresponding plurality of parallel straight lines equidistant from each other, the lens faces of each camera being maintained parallel to and equidistant from a focussing plane, a given flat plane within a photographing space being used as a focussing plane common to each camera.

11. A three-dimensional television system comprising a monocular photographing and transmitting apparatus including:
   a monocular camera for photographing an object to be photographed at a plurality of different planes to obtain a picture image for each different plane;
   angular division distribution pattern forming means for forming an angular division distribution pattern by connecting respective points of each said image obtained by said monocular camera which correspond to the same specific points of said object for each different plane; and
   transmitting means for classifying for transmission said angular division distribution pattern into at least brightness signals and depth signals.

12. A three-dimensional television system of claim 11, wherein said monocular camera comprises an optical unit including optical means for focussing said object, angle of incidence sorting means for sorting an incident light flux at a focussing plane for each direction of incidence, and recording and converting means for recording said angular division distribution pattern classified and angularly-divided for each direction of light incidence and converting an incident light into electrical signals.

13. A three-dimensional television system of claim 11, wherein said monocular camera comprises an optical unit including an objective lens for focussing said object, a combined means of a directionally-sorting prism for sorting an incident light flux at a focussing plane for each direction of incidence and a collective lens, a combined means of a small lens, a medium having a pinhole, and a photoelectric converting member for recording said angular division distribution pattern angularly-divided for each direction of incidence.

14. A three-dimensional television system of claim 13, wherein the diameter of said pinhole is smaller than the effective aperture of said small lens.

15. A three-dimensional television system of claim 11, wherein said monocular camera comprises an optical unit including an objective lens for focussing said object, a collective lens for collecting an incident light flux at a focussing plane, a combined means of a small lens and an angularly-dividing slit, and a photoelectric converting means for sorting for recording an incident light passing through said collective lens for each direction incidence.

16. A three-dimensional television system of claim 15, wherein said angularly-dividing slit is formed in said medium obliquely thereto.

* * * * *